(12) United States Patent
Pal

(10) Patent No.: US 11,262,133 B2
(45) Date of Patent: Mar. 1, 2022

(54) AIRCRAFT ELECTRONICS THERMAL REGULATION SYSTEMS

(71) Applicant: Hamilton Sundstrand Corporation, Charlotte, NC (US)

(72) Inventor: Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 308 days.

(21) Appl. No.: 16/659,047

(22) Filed: Oct. 21, 2019

(65) Prior Publication Data

US 2020/0049416 A1    Feb. 13, 2020

Related U.S. Application Data

(62) Division of application No. 15/229,569, filed on Aug. 5, 2016, now Pat. No. 10,451,353.

(51) Int. Cl.
*F28D 15/00* (2006.01)
*B64D 37/34* (2006.01)
(Continued)

(52) U.S. Cl.
CPC ............. *F28D 15/00* (2013.01); *B64D 13/08* (2013.01); *B64D 37/34* (2013.01); *B64D 47/00* (2013.01); *F28D 1/0435* (2013.01); *F28D 7/0066* (2013.01); *F28F 23/00* (2013.01); *F28F 27/02* (2013.01); *B64D 2013/0614* (2013.01); *B64D 2013/0659* (2013.01); *F28D 2021/0021* (2013.01); *F28D 2021/0026* (2013.01); *F28D 2021/0028* (2013.01); *F28F 2250/08* (2013.01)

(58) Field of Classification Search
CPC .... B64D 2013/0614; B64D 2013/0659; B64D 13/08; B64D 37/34; B64D 47/00; F28D 2021/0021; F28D 2021/0026; F28D 2028/0026; F28D 1/0435; F28D 7/0066; F28F 2250/08; F28F 23/00; F28F 27/02
See application file for complete search history.

(56) References Cited

U.S. PATENT DOCUMENTS 3,158,197 A * 11/1964 Blezard ................ B64D 13/006
62/7
3,513,907 A   5/1970 Hughes
(Continued)

FOREIGN PATENT DOCUMENTS

EP    1902950 A1    3/2008

OTHER PUBLICATIONS

Extended European Search Report prepared by the European Patent Office, dated Oct. 30, 2017, in corresponding European Patent Application No. 17184407.9.

*Primary Examiner* — Tho V Duong
(74) *Attorney, Agent, or Firm* — Locke Lord LLP; Daniel J. Fiorello; Gabrielle L. Gelozin

(57) ABSTRACT

An electronics cooling system for an aircraft includes a heat exchanger comprising a coolant circuit, an air circuit, and a fuel circuit such that each of the circuits is in thermal communication with at least one of the other circuits. The coolant circuit is in thermal communication with one or more aircraft electronics. The air circuit is in fluid communication with at least one air source. The fuel circuit is in fluid communication with a fuel tank between the fuel tank and an engine of the aircraft.

3 Claims, 2 Drawing Sheets

(51) Int. Cl.
    *B64D 13/08*     (2006.01)
    *F28D 1/04*     (2006.01)
    *B64D 47/00*     (2006.01)
    *F28D 7/00*     (2006.01)
    *F28F 23/00*     (2006.01)
    *F28F 27/02*     (2006.01)
    *B64D 13/06*     (2006.01)
    *F28D 21/00*     (2006.01)

(56) References Cited

U.S. PATENT DOCUMENTS

| | | | |
|---|---|---|---|
| 4,696,156 A * | 9/1987 | Burr | F02C 7/14 |
| | | | 60/39.08 |
| 4,944,344 A | 7/1990 | Crowe | |
| 5,967,461 A | 10/1999 | Farrington | |
| 7,374,601 B2 * | 5/2008 | Bonchonsky | B01D 53/0454 |
| | | | 95/138 |
| 8,016,232 B2 * | 9/2011 | Anderson | B64D 13/04 |
| | | | 244/118.5 |
| 8,162,035 B2 | 4/2012 | Behrens et al. | |
| 8,730,673 B2 | 5/2014 | Vos | |
| 9,097,169 B2 * | 8/2015 | Logan | F01P 9/00 |
| 9,157,683 B2 | 10/2015 | Doe et al. | |
| 2010/0043396 A1 * | 2/2010 | Coffinberry | F02K 3/06 |
| | | | 60/266 |
| 2010/0071638 A1 | 3/2010 | Bulin | |
| 2012/0312037 A1 * | 12/2012 | Finney | B64D 37/34 |
| | | | 62/115 |
| 2013/0318983 A1 | 12/2013 | Zhou et al. | |
| 2016/0161189 A1 | 6/2016 | Borghese et al. | |

* cited by examiner

AIRCRAFT ELECTRONICS THERMAL REGULATION SYSTEMS

CROSS-REFERENCE TO RELATED APPLICATION

This application is a divisional application of U.S. patent application Ser. No. 15/229,569 filed on Aug. 5, 2016, which is incorporated herein by reference in its entirety.

BACKGROUND

1. Field

The present disclosure relates to cooling systems, more specifically to aircraft electronics thermal regulation systems.

2. Description of Related Art

High power motor controllers and power conversion devices are either cooled by air flow or liquid cooling. Liquid is cooled by a ram air heat exchanger. A ram fan is used for heat rejection on ground. Existing ram air fans can have poor reliability due to foreign object damage and insufficient motor cooling issues. In next generation aircraft, however, electronics based power conversion, e.g., to produce variable speed constant frequency (VSCF) electric power, will increase cooling demand. Cooling such electronics can be insufficient with existing air cooling or traditional ram air fan cooling.

Such conventional methods and systems have generally been considered satisfactory for their intended purpose. However, there is still a need in the art for improved aircraft electronics thermal regulation systems. The present disclosure provides a solution for this need.

SUMMARY

An electronics cooling system for an aircraft includes a heat exchanger comprising a coolant circuit, an air circuit, and a fuel circuit such that each of the circuits is in thermal communication with at least one of the other circuits. The coolant circuit is in thermal communication with one or more aircraft electronics. The air circuit is in fluid communication with at least one air source. The fuel circuit is in fluid communication with a fuel tank between the fuel tank and an engine of the aircraft.

The air circuit and the fuel circuit can be in direct thermal communication with the coolant circuit within the heat exchanger. The coolant circuit can include a coolant, e.g., propylene glycol (e.g., Dowfrost™) or any other suitable coolant.

The at least one air source can include at least one of a cabin exhaust port and/or a ram air inlet. The air circuit can be in fluid communication with both a cabin exhaust port and a ram air inlet.

The system can include at least one air valve disposed between the at least one air source and the heat exchanger to selectively permit airflow from the at least one air source. In certain embodiments, a fan can be disposed between the cabin exhaust port and the heat exchanger to facilitate airflow from the cabin exhaust port to the heat exchanger.

The system can further include fuel valve disposed between the fuel tank and the heat exchanger to selectively permit fuel flow to the heat exchanger. In certain embodiments, the system can include a coolant pump disposed between the aircraft electronics and the heat exchanger.

In certain embodiments, the coolant circuit in the heat exchanger can include a plate shaped portion. The fuel circuit in the heat exchanger can include a plate shaped portion. The air circuit in the heat exchanger can include fins.

A method for cooling electronics on an aircraft includes controlling at least one air valve disposed between at least one air source and a heat exchanger to be closed during ground operations, taxi, take off, and climb, and to be open during cruise, descent and landing. The method also includes controlling a fuel valve disposed between a fuel tank and the heat exchanger to be open during ground operations, taxi, take off, and climb, and to be closed during cruise, descent, and landing.

Controlling the at least one air valve can include controlling the at least one air valve to allow only ram air to flow to the heat exchanger during cruise. Controlling the at least one air valve can include controlling the at least one air valve to allow only cabin exhaust air to flow to the heat exchanger during descent and landing.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
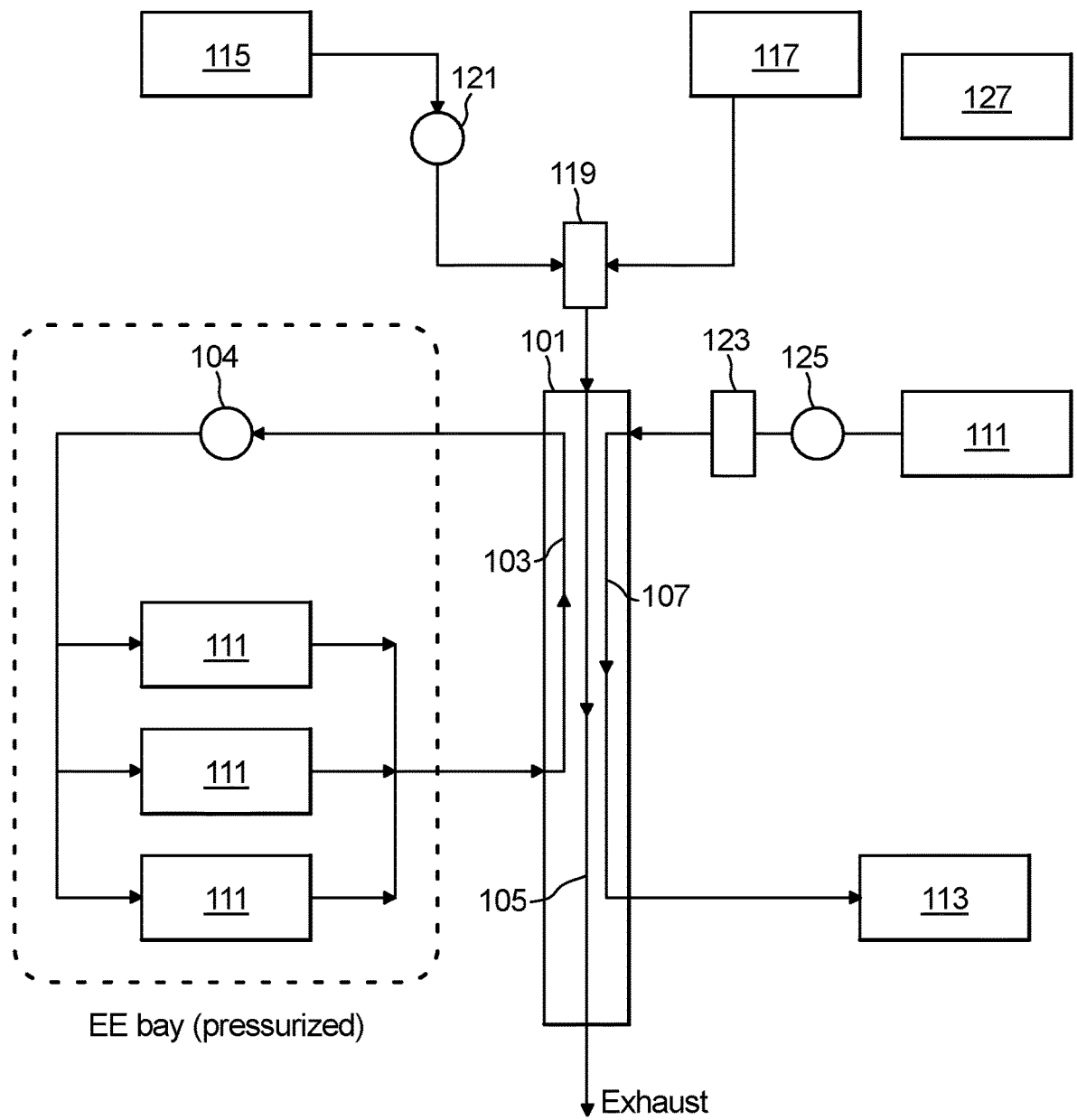
FIG. 1 is a schematic view of an embodiments of a system in accordance with this disclosure.
Figure 2:
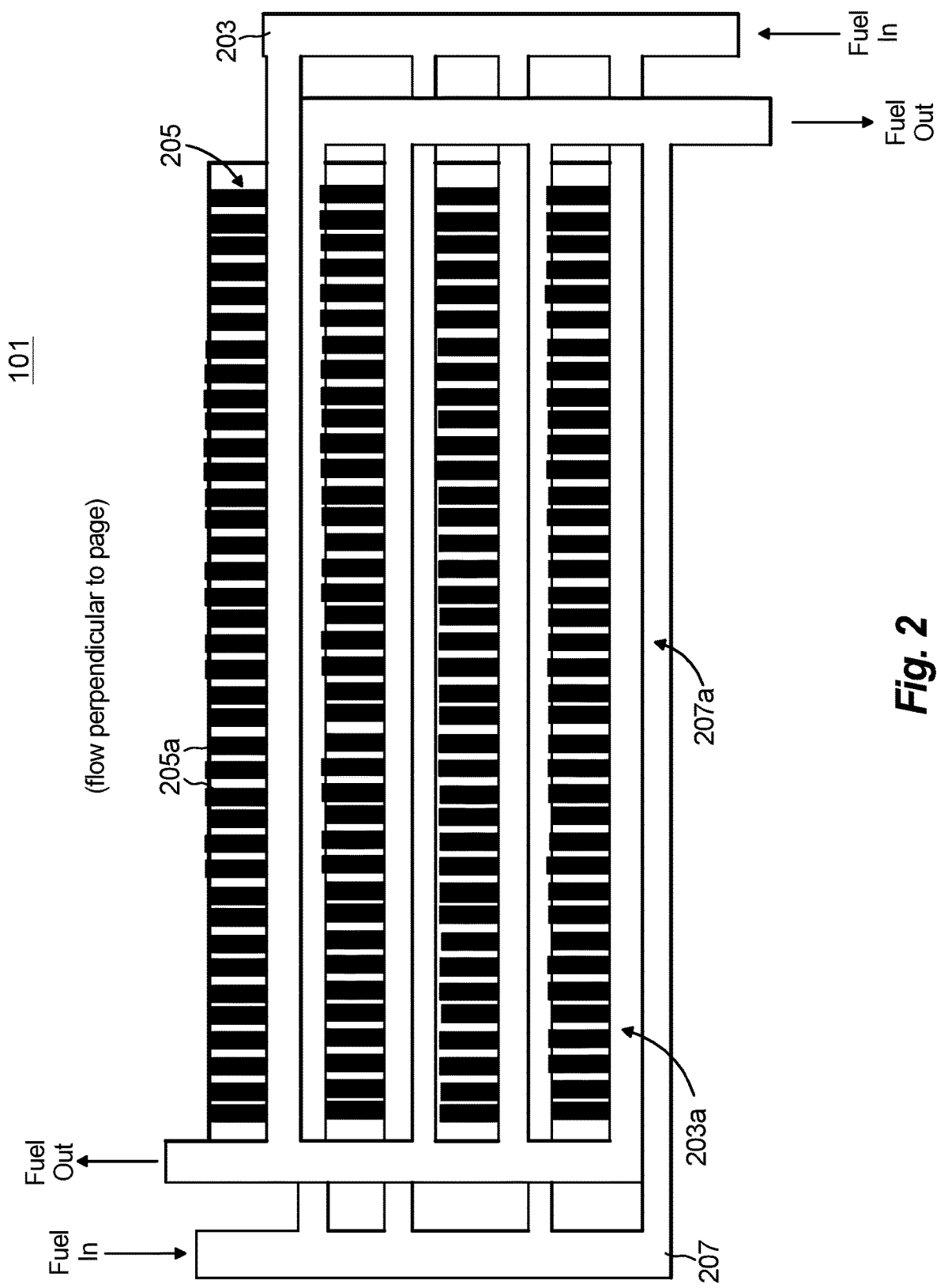
FIG. 2 is a side view of an embodiment of a heat exchanger in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. The systems and methods described herein can be used to cool aircraft electronics.

Referring to FIG. 1, an electronics cooling system 100 for an aircraft includes a heat exchanger 101 having a coolant circuit 103, an air circuit 105, and a fuel circuit 107 such that each of the circuits 103, 105, 107 is in thermal communication with at least one of the other circuits 103, 105, 107. The coolant circuit 103 is in thermal communication with one or more aircraft electronics 109, e.g., variable speed constant frequency electronics (VCSF).

The coolant circuit 103 can include a coolant, e.g., propylene glycol (such as Dowfrost™) or any other suitable coolant. In certain embodiments, the system 100 can include a coolant pump 104 disposed between the aircraft electronics 109 and the heat exchanger 101. The pump 104 can include any suitable pump and/or components thereof (e.g., a motor, a controller). The aircraft electronics 109 and/or the pump 104 can be housed in a pressurized portion of the aircraft, however, any suitable location is contemplated herein.

The air circuit 105 is in fluid communication with at least one air source. The at least one air source can include at least one of a cabin exhaust port 115 and/or a ram air inlet 117, for example. In certain embodiments, the air circuit 105 can be in fluid communication with both a cabin exhaust port 115 and a ram air inlet 117.

The system 100 can include at least one air valve 119 disposed between the at least one air source and the heat exchanger 101 to selectively permit airflow from the at least one air source. In certain embodiments, as shown in FIG. 1, the air valve 119 can be in fluid communication with both the cabin exhaust port 115 and the ram air inlet 117. The air valve 119 can be a selector valve configured to select between the cabin exhaust port 115 and the ram air inlet 117 and/or can be configured to allow and/or shut off airflow from one or both of the cabin exhaust port 115 or the ram air inlet 117.

In certain embodiments, a fan 121 can be disposed between the cabin exhaust port 115 and the heat exchanger 101 to facilitate airflow from the cabin exhaust port 115 to the heat exchanger 101. The fan 121 can include any suitable fan and/or components thereof (e.g., a motor, a controller).

The fuel circuit 107 is in fluid communication with a fuel tank 111 between the fuel tank 111 and an engine 113 of the aircraft. The air circuit 105 and the fuel circuit 107 can be in direct thermal communication with the coolant circuit 103 within the heat exchanger 101. Any other suitable arrangement (e.g., indirect communication) is contemplated herein. The system 100 can further include fuel valve 123 disposed between the fuel tank 111 and the heat exchanger 101 (e.g., downstream of a fuel pump 125) to selectively permit fuel flow to the heat exchanger 101.

In certain embodiments, referring additionally to FIG. 2, a heat exchanger 201 can include any suitable design. For example, as shown, the coolant circuit 203 in the heat exchanger 201 can include a plate shaped portion 203a. In certain embodiments, the fuel circuit 207 in the heat exchanger 201 can include a plate shaped portion 207a. The air circuit 205 in the heat exchanger 201 can include fins 205a. The heat exchanger 201 and portions thereof can be made of any suitable material (e.g., metal). The cooling plate portion 203a may have a top plate, a bottom plate, and fins (not shown) therebetween and inside to enhance transfer of heat between coolant and the external air or fuel flow. The cooling plate portion 207a may have a top plate, a bottom plate, and fins (not shown) inside to enhance transfer of heat between coolant and fuel flow.

The system 100 can further include a controller 127 operatively connected to each of the valves 119, 123, and/or pumps 104, 121, 125. In certain embodiments, the controller 127 can be configured to operate each of the valves 119, 123 and/or pumps 104, 125, and/or fan 121 to modify which circuits 103, 105, 107 are used for heat exchange (e.g., cooling), for example. The controller 127 can include any suitable hardware and/or software configured to control one or more of the valves 119, 123 and/or pumps 104, 125, and/or fan 121. The controller 127 can be configured to execute any suitable embodiment of a method (e.g., as described below) for cooling electronics.

In certain embodiments, a method for cooling electronics on an aircraft includes controlling at least one air valve 119 disposed between at least one air source and a heat exchanger 101 to be closed during ground operations, taxi, take off, and climb, and to be open during cruise, descent and landing, for example. The method also includes controlling a fuel valve 123 disposed between a fuel tank 111 and the heat exchanger 101 to be open during ground operations, taxi, take off, and climb, and to be closed during cruise, descent, and landing, for example.

In certain embodiments, controlling the at least one air valve 119 can include controlling the at least one air valve 119 to allow only ram air to flow to the heat exchanger 101 during cruise. Controlling the at least one air valve 119 can include controlling the at least one air valve 119 to allow only cabin exhaust air to flow to the heat exchanger 101 during descent and landing, for example.

Embodiments allow thermal regulation (e.g., cooling or heating) of electronics. For example, VSCF cold plates can be cooled by flowing coolant (e.g., Dowfrost™) or any other suitable coolant through cold pates. Coolant can be pumped to a coolant/fuel/air heat exchanger 101. This heat exchanger 101 can cool the coolant with either fuel or air or both. While on ground or take off, the heat exchanger 101 can be cooled by fuel, for example. For cruise mode, the fuel flow to the heat exchanger 101 can be stopped, the ram air door can be opened and an air selector/on-off air valve 119 can allow ram air to flow through heat exchanger 101 to cool the coolant. Before landing, the ram air door can be closed and passenger cabin exhaust air can be used. In this manner, embodiments allow the elimination of the ram air fan system. Benefits include a higher reliability of the cooling system and a reduced cost of cooling system. While systems herein can be used for cooling, it is contemplated that embodiments can be used for heating and/or any suitable temperature regulation.

The methods and systems of the present disclosure, as described above and shown in the drawings, provide for aircraft electronics thermal regulation systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for cooling electronics on an aircraft, comprising:
   controlling at least one air valve disposed between at least one air source and a heat exchanger to be closed during ground operations, taxi, take off, and climb, and to be open during cruise, descent and landing; and
   controlling a fuel valve disposed between a fuel tank and the heat exchanger to be open during ground operations, taxi, take off, and climb, and to be closed during cruise, descent, and landing.

2. The method of claim 1, wherein controlling the at least one air valve includes controlling the at least one air valve to allow only ram air to flow to the heat exchanger during cruise.

3. The method of claim 1, wherein controlling the at least one air valve includes controlling the at least one air valve to allow only cabin exhaust air to flow to the heat exchanger during descent and landing.

* * * * *